No. 816,408. PATENTED MAR. 27, 1906.
G. WILHELM.
BLOCK MOLDING MACHINE.
APPLICATION FILED APR. 20, 1905.
3 SHEETS—SHEET 1.
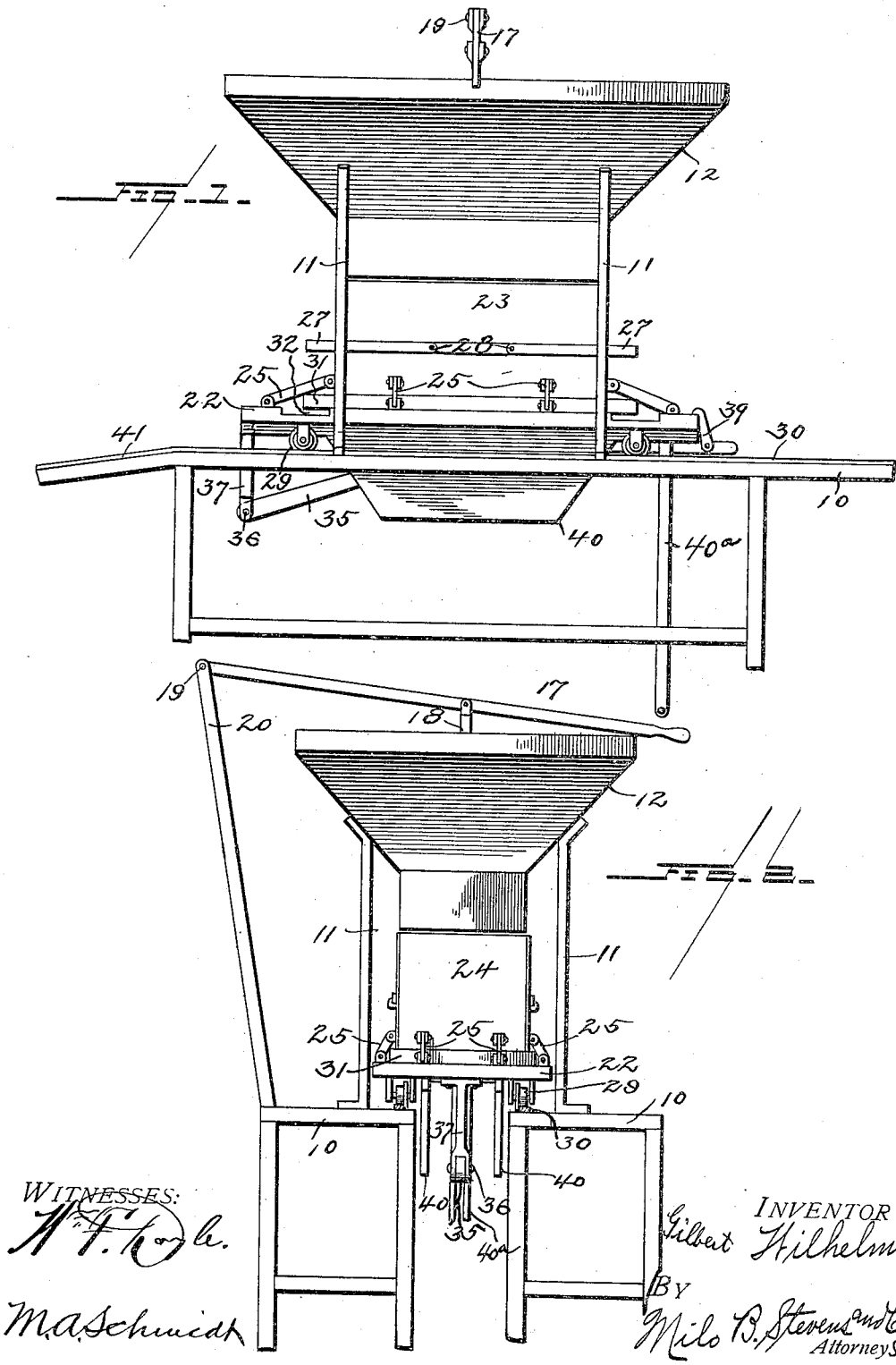

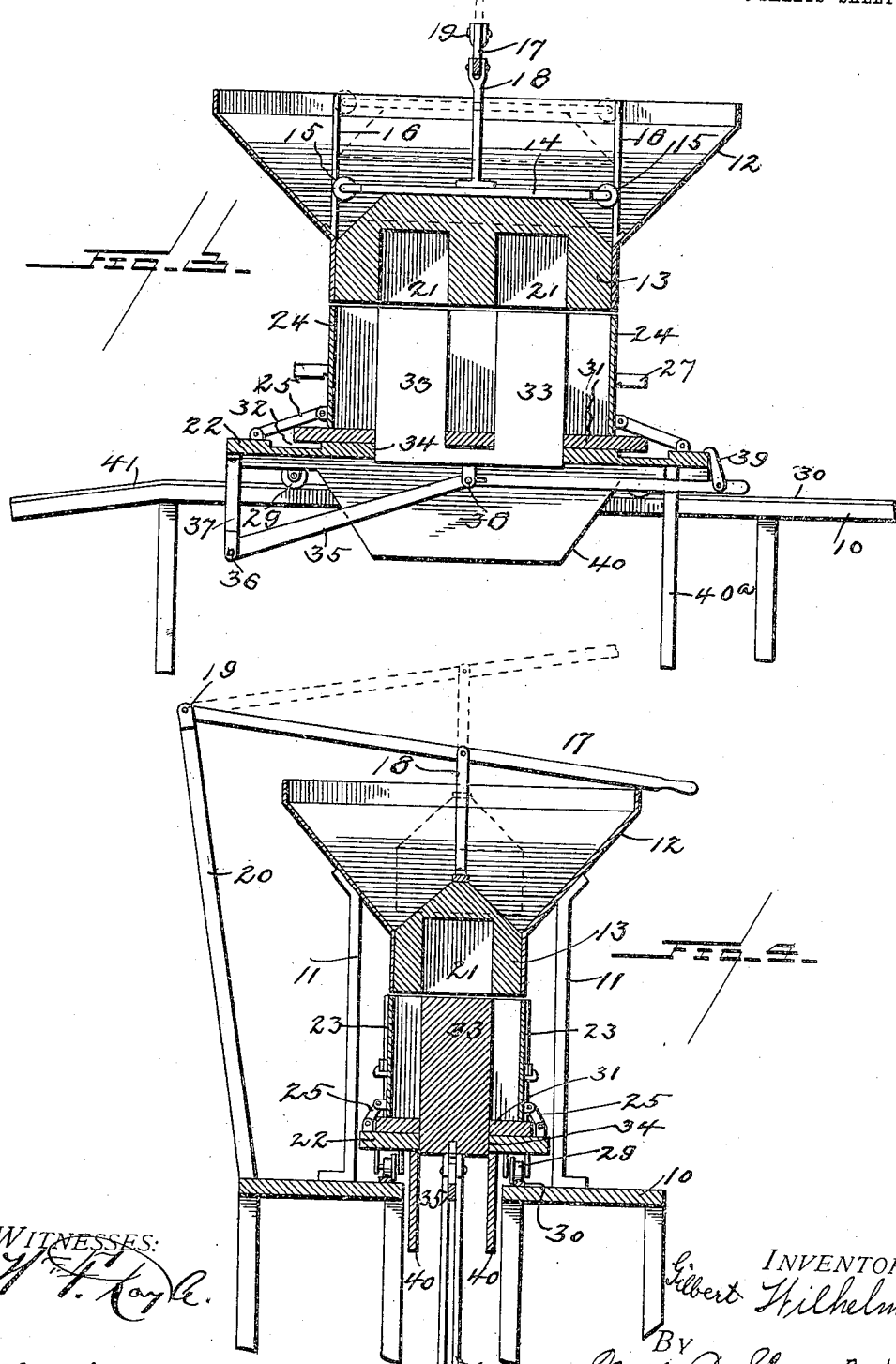

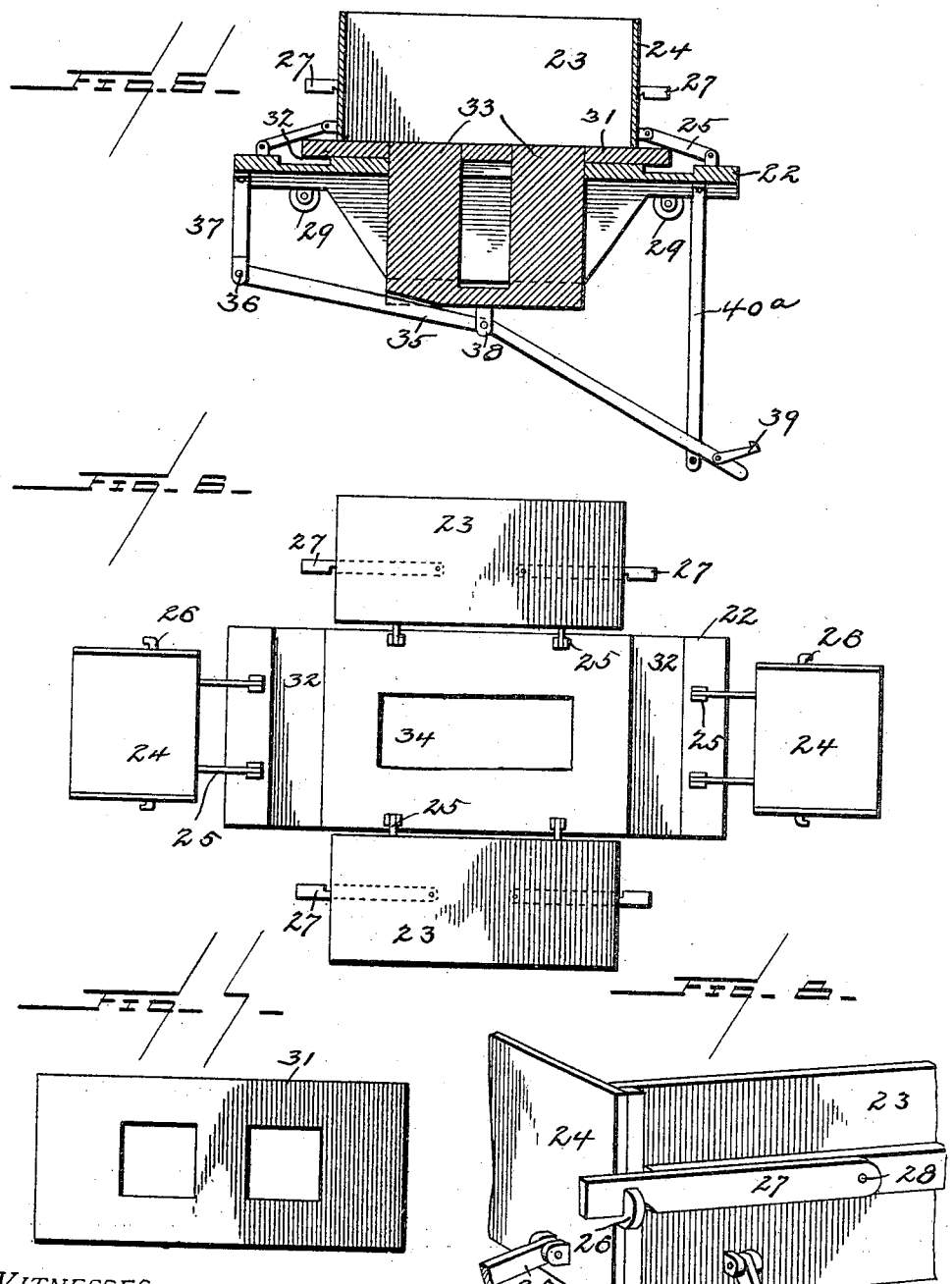

UNITED STATES PATENT OFFICE.

GILBERT WILHELM, OF TRAVERSE CITY, MICHIGAN.

BLOCK-MOLDING MACHINE.

No. 816,408.  Specification of Letters Patent.  Patented March 27, 1906.

Application filed April 20, 1905. Serial No. 256,626.

*To all whom it may concern:*

Be it known that I, GILBERT WILHELM, a citizen of the United States, residing at Traverse City, in the county of Grand Traverse and State of Michigan, have invented new and useful Improvements in Block-Molding Machines, of which the following is a specification.

My invention is a machine for forming blocks of plastic material, and has for its object certain novel features of construction hereinafter described and claimed.

The invention is characterized by a filling-hopper containing the plastic material from which the blocks are molded and a portable mold which is carried away from the hopper after having been filled.

In the accompanying drawings, Figure 1 is a side elevation, and Fig. 2 an end view, of the entire machine. Fig. 3 is a longitudinal, and Fig. 4 a transverse sectional, view. Fig. 5 is a longitudinal section of the mold and its carrier. Fig. 6 is a top plan view of the mold open. Fig. 7 is a plan view of the pallet used in connection with the mold. Fig. 8 is a detail in perspective showing the manner of fastening the side and end pieces of the mold together.

Referring specifically to the drawings, 10 denotes a table or other suitable support on which the working parts of the machine are mounted. Standards 11 rise from the table and support the hopper 12, which contains the plastic material from which the blocks are made. The sides of the hopper are made sloping, as shown, to facilitate the discharge of the material. The hopper contains a tamper 13, having at the top a cross-arm 14, which carries at its outer ends guide-wheels 15, traveling on vertical tracks 16, arranged inside the hopper. The top of the tamper is peaked, as shown, so that when it is raised the material runs readily down its sides. An operating-lever 17 for raising and lowering the tamper is connected to a stem 18, rising from the top of the tamper. The lever is fulcrumed at 19 on a standard 20, rising from the table. The tamper has recesses 21, which register with the cores to be described hereinafter.

The mold is carried on a wheeled platform 22 and comprises sides 23 and ends 24, which are hinged at their lower ends by links 25 to the platform. Hooks 26 project from the outer ends of the end pieces 24, which hooks are engaged by latches 27, pivoted, as at 28, to the side pieces 23. When the latches are disengaged, the mold can be opened, as shown in Fig. 6, to release the block. The wheels 29 of the platform travel on a track 30, arranged on top of the table 10. In use a pallet 31 is placed on the platform, the mold being placed on top of the pallet. The latter projects a little beyond the end pieces 24 of the mold, and the platform is also recessed, as at 32, so that the hand can be readily placed under the pallet to lift it off the platform.

The cores are indicated at 33 and enter the mold from the bottom, openings 34 being made in the platform and pallet through which the cores enter the mold. The cores are raised and lowered by a lever 35, which is fulcrumed at one end, as at 36, to a bracket 37, depending from the platform 22. The lever is connected, as at 38, to the cores at the bottom thereof and has at its free end a pivoted latch 39, adapted to be hooked over the platform, as shown in Fig. 3, to hold the cores in elevated position. Guide-pieces 40 extend downwardly from the under side of the platform, between which guides the cores travel. The lever 35 works between guides 40ª, depending from the platform. Between the tracks the table 10 is open, as shown in Figs. 2 and 4, between which opening the cores and their associate parts extend.

The operation of the machine is as follows: The hopper being filled, the mold is run thereunder and the cores elevated, as shown in Fig. 3, the lever 35 being locked by the latch 39. The tamper 13 is then raised by its lever 17 to the position shown by dotted lines in Figs. 3 and 4, which permits the material to run down into the mold. As the tamper has a peaked top, it facilitates the discharge of the material into the mold. The tamper is then lowered and again raised as before, and so on until the mold is filled. The wheeled platform with the filled mold is then pushed to the inclined portion 41 of the track and run to the block pile. The attendant then runs a straight-edge or trowel over the top of the block to smooth it and repair damages done in transit. The lever 35 is then released, and the cores are withdrawn, after which the latches 27 are disengaged, which opens the mold and releases the block. The latter is then picked up by the pallet 31 and placed on the block pile. The mold is then closed and the cores readjusted, and the platform is returned to the hopper. In order to operate rapidly a number of portable molds, as herein described, will be used.

Having thus described my invention, what is claimed as new, and desired to be secured by Letters Patent, is—

1. A block-molding machine comprising a filling-hopper, a wheeled platform having recesses in its top, a pallet on the platform and having its ends overhanging the recesses, a mold having its sides and ends hinged to the platform and resting on the pallet, and cores carried by the platform and extensible therethrough and through the pallet into the mold.

2. The combination of a table formed of two spaced parts, a hopper over the table, a wheeled platform mounted on the table, guides extending downwardly from the platform into the space between the parts of the table, a mold mounted on the platform, said mold and platform having registering openings, and cores carried by the platform and movable up and down between the guides and through the said openings into and out of the mold.

3. The combination of a table formed of two spaced parts, a hopper supported on the table, a wheeled platform mounted on tracks on the parts of the table, and movable over the space therebetween, a mold on the platform, said platform and mold having registering openings, and a core carried by the platform and movable up and down in the said space and through the said openings into and out of the mold.

4. In a block-molding machine, in combination, a filling-hopper, a mold thereunder, and a tamper working up and down in the hopper and having a peaked top.

In testimony whereof I have signed my name to this specification in the presence of two subscribing witnesses.

BERT WILHELM.

Witnesses:
Wm. H. Umlor,
E. F. Holcomb.